(12) United States Patent
Tran et al.

(10) Patent No.: US 9,571,395 B2
(45) Date of Patent: Feb. 14, 2017

(54) RECONFIGURABLE INTERCONNECT ELEMENT WITH LOCAL LOOKUP TABLES SHARED BY MULTIPLE PACKET PROCESSING ENGINES

(71) Applicant: CAVIUM, INC., San Jose, CA (US)

(72) Inventors: Anh Tran, Santa Clara, CA (US); Gerald Schmidt, San Jose, CA (US)

(73) Assignee: CAVIUM, INC., San Jose, CA (US)

( * ) Notice: Subject to any disclaimer, the term of this patent is extended or adjusted under 35 U.S.C. 154(b) by 115 days.

(21) Appl. No.: 14/617,644

(22) Filed: Feb. 9, 2015

(65) Prior Publication Data

US 2016/0234115 A1    Aug. 11, 2016

(51) Int. Cl.
*H04L 12/28* (2006.01)
*H04L 12/743* (2013.01)
*H04L 12/933* (2013.01)

(52) U.S. Cl.
CPC ......... *H04L 45/7457* (2013.01); *H04L 49/109* (2013.01); *H04L 49/1576* (2013.01)

(58) Field of Classification Search
None
See application file for complete search history.

(56) References Cited

U.S. PATENT DOCUMENTS

| | | | | |
|---|---|---|---|---|
| 5,970,232 A * | 10/1999 | Passint | ............. | G06F 15/17381 370/351 |
| 6,256,683 B1 * | 7/2001 | Barry | .................... | G06F 13/28 710/26 |
| 2004/0210693 A1 * | 10/2004 | Zeitler | ............... | G06F 12/0815 710/100 |
| 2012/0036231 A1 * | 2/2012 | Thakur | .................. | H04L 45/00 709/220 |
| 2014/0044135 A1 * | 2/2014 | Sankaralingam | ..... | H04L 45/745 370/401 |
| 2015/0295862 A1 * | 10/2015 | Banerjee | ............... | H04L 49/602 370/392 |
| 2015/0370586 A1 * | 12/2015 | Cooper | ............... | G06F 9/45533 710/308 |
| 2016/0142316 A1 * | 5/2016 | Wang | .................. | H04L 45/7457 370/392 |
| 2016/0173338 A1 * | 6/2016 | Wolting | ............... | H04L 41/145 709/223 |

* cited by examiner

*Primary Examiner* — Anh-Vu Ly
(74) *Attorney, Agent, or Firm* — Duane Morris LLP; David T. Xue

(57) ABSTRACT

The invention describes the design of an interconnect element in a programmable network processor/system on-chip having multiple packet processing engines. The on-chip interconnection network for a large number of processing engines on a system can be built from an array of the proposed interconnect elements. Each interconnect element also includes local network lookup tables which allows its attached processing engines to perform lookups locally. These local lookups are much faster than the lookups to a remote search engine, which is shared by all processing engines in the entire system. Local lookup tables in each interconnect element are built from a pool of memory tiles. Each lookup table can be shared by multiple processing engines attached to the interconnect element; and each of these processing engines can perform lookups on different lookup tables in run-time.

24 Claims, 8 Drawing Sheets

US 9,571,395 B2

RECONFIGURABLE INTERCONNECT ELEMENT WITH LOCAL LOOKUP TABLES SHARED BY MULTIPLE PACKET PROCESSING ENGINES

TECHNICAL FIELD

The present invention relates to an interconnect element which is used to build a bigger interconnection network for a multi-engine network processor. The interconnection element also includes several local reconfigurable lookup tables which are shared by the processing engines directly connected to it.

BACKGROUND

As the network protocol stack in current data communication network has become more and more complicated, the design and architecture of network processors/systems on-chip have advanced dramatically to support processing and transferring multiple flows of packets at the line rate of up to hundreds of Gbps nowadays.

With the emerging of software defined networks (SDN), more new protocols and standards are expected to added to network devices in the near future. As a result, more processing engines are added into network processors/systems on chip so that they can process multiple network tasks in parallel. Parallelism can be performed not only by multiple parallel packet flows in a network-processing system on chip but also by multiple task parallelism per flow. One processing engine can handle one or multiple tasks; and one task can also be mapped to one or a few processing engines.

As the number of processing engines becomes large (tens or hundreds), an on-chip network connecting these processing engines is needed. To avoid wiring complexity and congestion, the on-chip network consists of multiple interconnect elements connected in a regular topology such as mesh or tree. Each interconnect element directly connects one or a few processing engines. In literature, the on-chip interconnect element is typically named on-chip router or on-chip switch. Processing engines on a system on-chip communicate each other indirectly by sending packets through a network built from interconnect elements. Interconnect elements forward packets based on the destination processing engine address embedded in each packet.

Processing engines in a network system on chip are programmable so that the system can adapt with network feature changes by users. As a result, the on-chip communication network connecting these processing engines is also programmable and flexible for supporting the packet flow changes among processing engines.

One of the main tasks of each processing engine in a network processor is performing lookups for packets. Lookup operations are determined by the network protocols and features programmed to that processing engine. The lookup results are used for performing more actions on the packet such as modifying some fields in the packet and/or forwarding packet to the correct destination port.

Traditionally, processing engines perform lookups on a remote search engine which contains a large number of lookup tables shared by all processing engines in the entire system. A shared central search engine is easy to manage, but it has some drawbacks. First, the wirings from all processing engines to the search engine are highly complicated which consume high power and reduce overall silicon utilization. Second, round-trip latency from when a processing engine sends a lookup request to the search engine to when it receives the lookup result is high. Third, configuring the shared search engine to achieve high lookup bandwidths for all processing engines is difficult.

As an effort to reduce the lookup latency and increase the lookup bandwidth, parts of look tables are physically moved from the search engine to inside the processing engines. With this design movement, each processing engine is able to perform lookups on its internal lookup tables more frequently so that achieves low latency and high bandwidth lookups. Only complicated lookups, which require more computation power and large memory capacity, are performed on the shared remote search engine. This approach, however, also has its own disadvantages. Because the capacity of lookup tables in each processing engine is hardware-fixed, the user cannot allocate bigger tables for the processing engine; hence the processing engine is forced to access the remote search engine eventually. At another end, when the user only needs a small lookup table for a processing engine, the remaining memory capacity in that processing engine is wasted meaning it has low memory resource utilization.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures in which like reference characters refer to the same parts throughout the different views. It is noted that, in accordance with the standard practice in the industry, various features are not drawn to scale and emphasis instead being placed upon illustrating embodiments of the present invention. In fact, the dimensions of the various features may be arbitrarily increased or reduced for clarity of discussion. The scope of the present patent application is not limited to the disclosed embodiments, but also encompasses combinations of the disclosed embodiments, as well as modifications to the disclosed embodiments.

DETAILED DESCRIPTION

Figure 1:
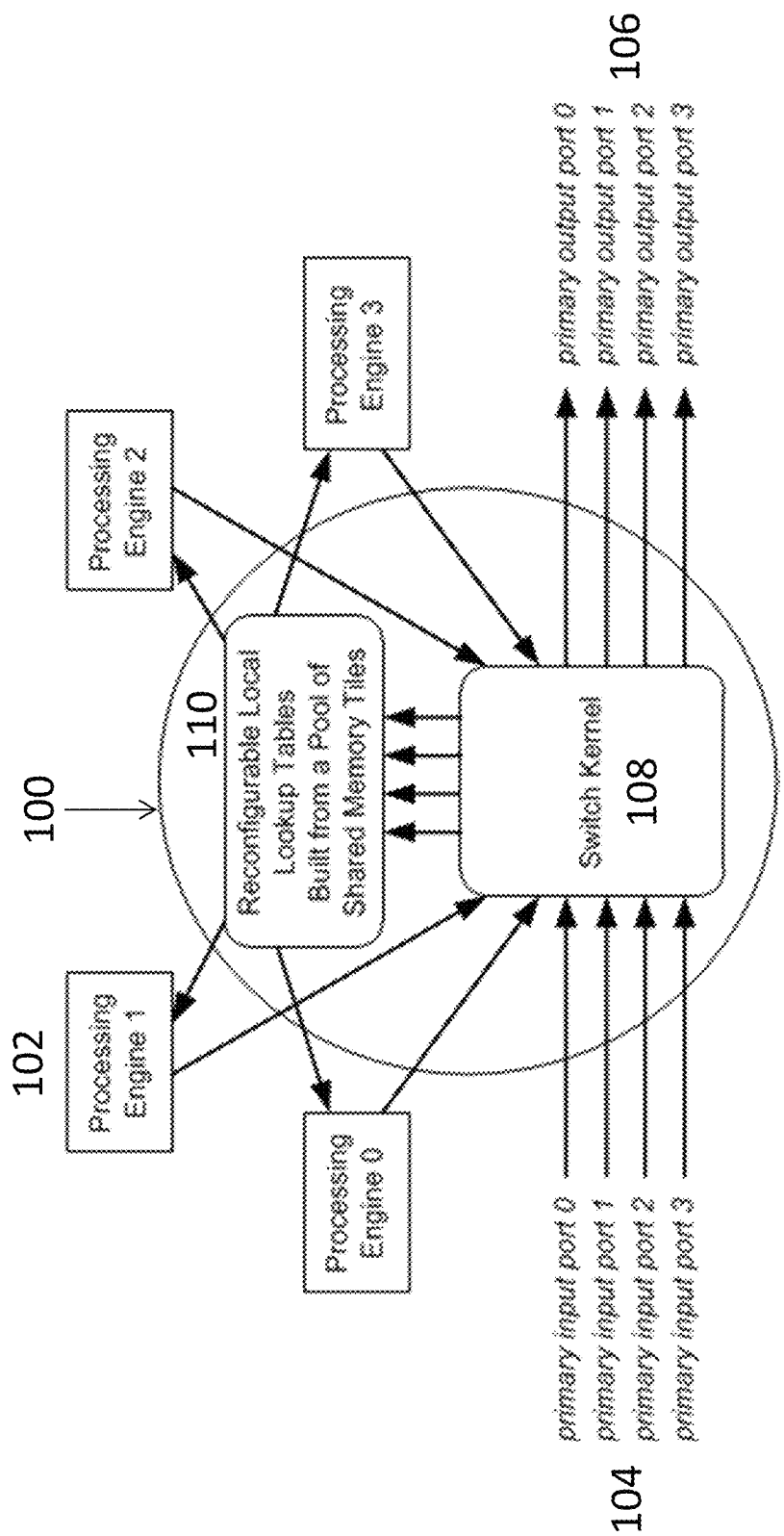
FIG. 1 is an example of a block diagram of the proposed reconfigurable interconnect element with local memory-based lookup tables (ISME) according to an embodiment of the present invention.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new hybrid solution is proposed, which allows reconfiguring the memory capacity of lookup tables in processing engines, and hence achieves higher memory usage utilization. As an interconnect element can directly connect multiple processing engines, all these memory modules/tiles can be moved to the interconnect element instead of dedicating table-memory resource for each of these processing engines. As a result, all processing engines attached to the same interconnect element share the same pool of memory modules/tiles. Each processing engine is allocated a part from the pool for its lookup tables, which can be of varying sizes depending on the user through software configuration. In addition, multiple processing engines can access the same lookup table.

Under the proposed approach, the interconnect element can be replicated for building a bigger on-chip network, which connects a plurality of processing engines in a network processor. In some embodiments, the pool of memory tiles in each interconnect element can be configured into multiple lookup tables, wherein the lookup tables can operate as hash tables, TCAMs or direct-access tables. Each lookup table can be shared by multiple local processing engines in run-time and each local processing engine of an interconnect element can be allocated one or multiple of the configured lookup tables.

By allowing processing engines to share a reconfigurable pool of memory tiles inside an interconnect element, the proposed approach not only achieves higher memory usage utilization but also has lower lookup latency because the interconnect element is directly attached to these processing engines which have short interconnection wires compared to connecting to a remote search engine shared by all processing engines in the system. In addition, because the number of processing engines directly connected to an interconnect element is small, the user may also easily manage and configure the lookup tables for these processing engines compared to having to handle a much bigger and more complicated central search engine.

FIG. 1 shows an example of a top-level block diagram of the proposed interconnect element 100. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, the interconnect element 100 has multiple primary input ports 104s and primary output ports 106, which allow it to connect with other interconnect elements 100 for building a bigger interconnection network. The interconnect element 100 directly connects to local programmable processing engines (PEs) 102s, which perform different network processing tasks in a multi-processing network device/system on-chip. Each PE 102 receives packets from the interconnect element 100, performs lookups, then does some actions on the received packets (including but not limited to modifying fields in the packets). The modified packets are then sent back to the interconnect element 100, from there the packets are forwarded to another PE 102 (either at the same interconnect element or to another PE 102 at another interconnect element 100 in the system) for further processing.

Although the example depicted in FIG. 1 shows only four PEs 102s connected to each of the interconnect elements 100 as an non-limiting example, generally more or less PEs 102s can be connected to an interconnect element 100 by increasing or reducing the PE input ports 104s and/or output ports 106s. Similarly, the number of primary input ports 104s and/or output ports 106s could be different. In some embodiments, the number of primary input ports 104 and/or output ports 106 should be not more than the number of local PEs 102s so that in the best case the user can configure each primary port to send packets directly to a dedicated PE 102 without being conflicted with other primary ports.

In the example of FIG. 1, the interconnect element 100 includes two main blocks: a switch kernel 108 and a pool of shared memory tiles 110. The switch kernel 108 is configured to correctly route packets from an input port (from a primary input port 104 or from a local PE 102) to an output port (to a primary output port 106 or to a local PE 102). The pool of shared memory tiles 110 is configured to be local lookup tables for local PEs 102s. Because the proposed interconnect element 100 includes both switch function and local memory lookup function, it is referred to hereinafter as Interconnect Switch and Memory Element (ISME).

Figure 2:
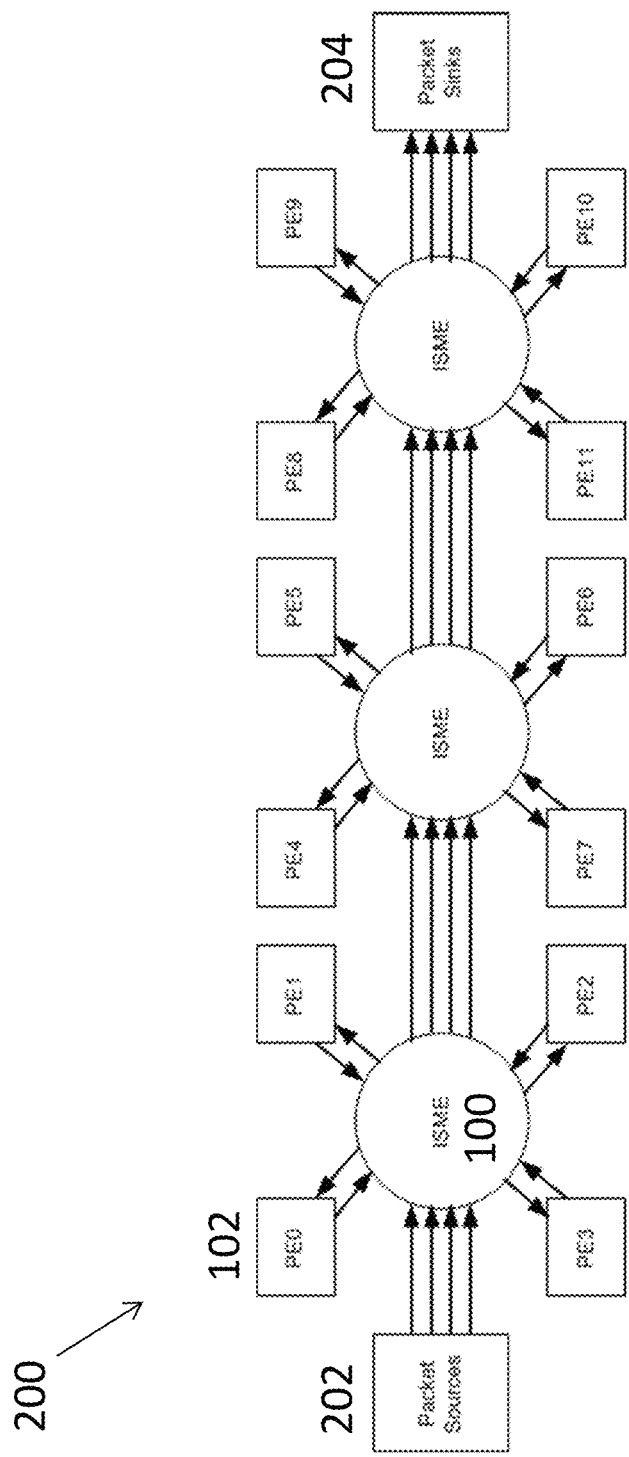
FIG. 2 is a diagram illustrating an example of a larger on-chip network built from an array of the interconnect elements according to an embodiment of the present invention.
Figure 3A:
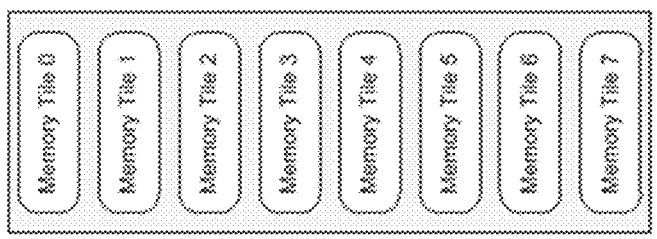
FIGS. 3(a)-(e) illustrate examples to partition a pool of memory tiles into different number of shared lookup tables according to an embodiment of the present invention.
Figure 3B:
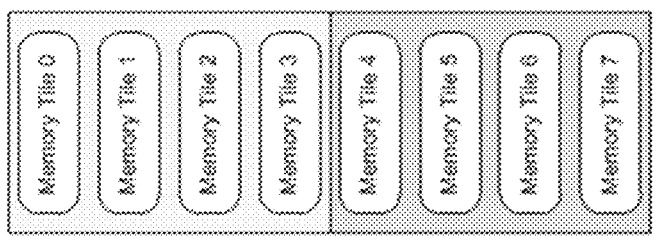
Figure 3C:
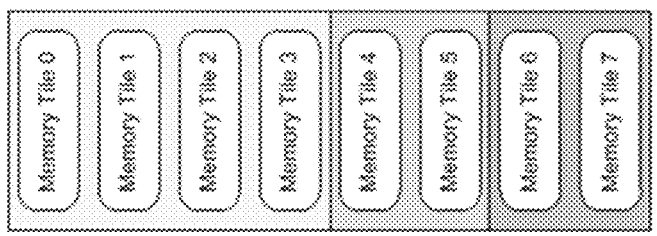
Figure 3D:
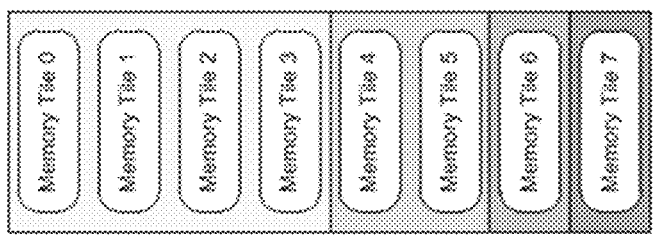
Figure 3E:
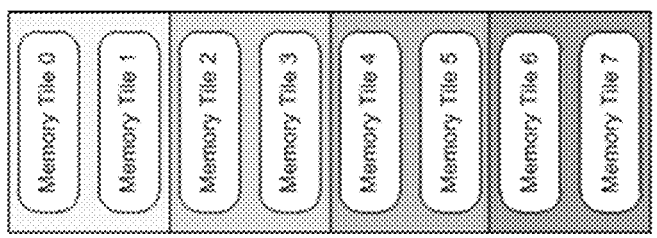

FIG. 2 illustrates an example of a larger on-chip network for connecting a large number PEs 102 in a system 200 built on chip from an array of ISMEs 100. In the example depicted in FIG. 2, packets are injected into the network from a packet source 202 which has received the packets from other components of the system. The packet source is configured to send packets on all or a few primary input ports of the first ISME 100. The ISME 100 will then route the packets to its local PEs 102s or to next downstream ISME 100. Here, the packet routing decision is based on the destination PE's virtual address embedded in each packet. Once packets are completely processed by the proper PEs 102 as defined by the network features of the system, packets are forwarded to the last ISME 100, from there they are forwarded to a packet sink 204, where packets are sent to other components of the system for more processing if any or are sent to other devices.

In some embodiments, each ISME 100 may perform a lookup operation to have more information before a packet is sent to a local PE 102 so that the PE 102 can make proper actions on the packet. Traditionally, that lookup operation is performed by the PE 102 via a remote search engine (not shown), which is shared by all PEs 102s in the system. However, the lookup on a remote search engine incurs a long latency due to the long and complex wires and may also incurs a low throughput due to the congestion with several lookups from other PEs 102s at the same time. In some embodiments, small lookup tables are added locally inside each interconnect element/ISME 100 so that local PEs 102 attached to an interconnect element 100 can do faster lookups with higher throughput.

In some embodiments, the lookup tables in the interconnect element 100 is built from a pool of memory tiles 110, which allow the lookup tables to be configured in different sizes depending on the needs of PEs 102s. As different PEs 102s have different lookup requirements, the sizes of the lookup tables should be reconfigured accordingly. In addition, different PEs 102s are configured to access different lookup tables independently. In some embodiments, two or more PEs 102s can access the same lookup table if these PEs 102s have the same network features. Please note that the type of lookup operations is a design option. If the memory tiles 110 are static random-access memory (SRAM) memory modules, for a non-limiting example, then the lookup tables can be hash-based or direct-access lookup tables. If the memory tiles 110 are TCAM modules, for another non-limiting example, then the lookup tables are TCAM lookup tables.

In some embodiments, the number of memory tiles 110 reserved for each lookup table can be a power of 2 for the most efficient usage of lookup tables. This rule allows using all bits of a memory index to access all entries in all memory tiles 110 in a lookup table. Another rule is that there should be no overlap between any two lookup tables. This rule allows the user to program each lookup table separately depending on the network features that the lookup table supports. One more rule is that all memory tiles 110 reserved for a lookup table are in consecutive positions. This rule allows the users to locate each lookup table by the first tile offset and number of tiles; hence allows configuring the lookup table more conveniently. If the user wants a PE 102 to access non-consecutive memory tiles 110, the user would better partition the memory tiles 110 to multiple smaller lookup tables of consecutive memory tiles 110.

In some embodiments, at least one lookup table is reserved for each PE 102 so that each PE 102 can access the lookup tables separately without congestion. Therefore, the maximum supported number of lookup tables is at least equal to the number of PEs 102s and not more than the number of memory tiles 110 in an ISME 100. The maximum supported number of lookup tables built from the pool of local memory tiles 110 is predefined by hardware. The number of actually active lookup tables is configured before run-time by the user but should not be larger than the maximum number of supported lookup tables predefined. In some embodiments, all PEs 102s share the same one lookup table so the minimum number of configured lookup tables is one. In some embodiments, partitioning of the lookup tables is done before run-time and is not changed until the user reconfigures the ISME 100.

FIGS. 3(*a*)-(*e*) illustrate examples where the memory pool has eight memory tiles 110 shared by four local PEs 102 and the maximum number of supported lookup tables is four. There are several ways to partition the memory tiles 110 to the lookup tables. It is up to the user to choose, but must follow the four rules mentioned above: 1) the number of memory tiles 110 per lookup table is a power of two; 2) memory tiles 110 of each lookup table are in consecutive positions; 3) no overlap among the lookup tables; 4) the number of lookup tables is not more than the hardware-supported maximum number of lookup tables.

For a non-limiting example, given eight memory tiles 110 and the maximum number of supported lookup tables is four, the user can configure the memory pool to have 1, 2, 3 or 4 tables with the number of memory tiles 110 per table is a power of 2: i.e. 1, 2, 4 or 8. FIG. 3(*a*) shows eight memory tiles 110s grouped into one lookup table. FIG. 3(*b*) shows two tables each allocated with four memory tiles 110s. FIG. 3(*c*) shows three lookup tables in which table 0, table 1 and table 2 are allocated 4, 2 and 2 memory tiles 110s, respectively. FIG. 3(*d*) shows four lookup tables in which table 0, table 1, table 2 and table 3 are allocated 4, 2, 1 and 1 memory tiles 110s, respectively. FIG. 3(*e*) shows another partition for four lookup tables in which each lookup table has 2 memory tiles 110s.

Figure 4:
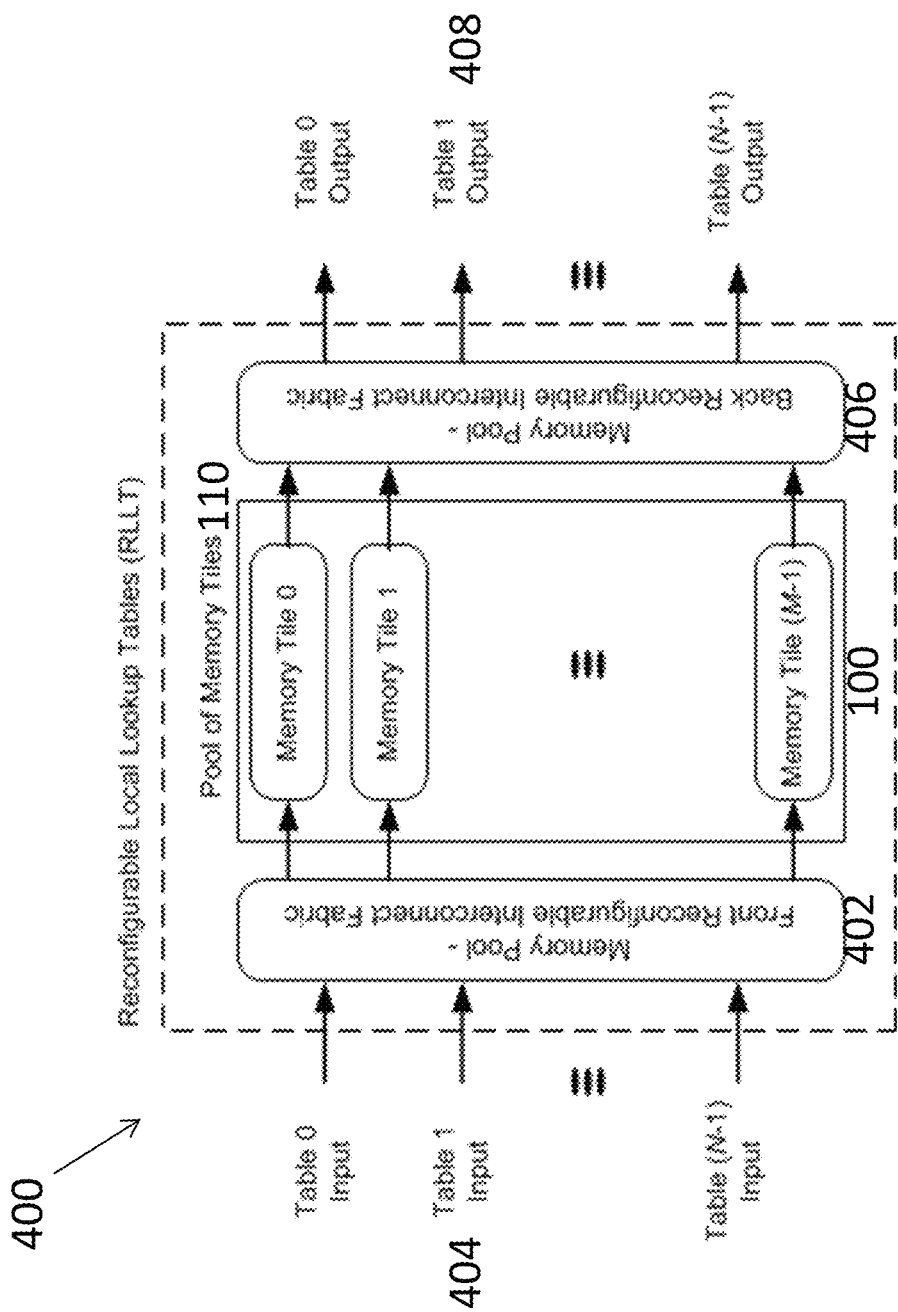
FIG. 4 is a diagram showing an example of the design of reconfigurable local lookup tables (RLLT) built from a pool of memory tiles according to an embodiment of the present invention.

FIG. 4 shows an example of a design block diagram of reconfigurable local lookup tables (RLLT) 400. The tables 400 are built from a pool of memory tiles 110s located locally in an ISME 100. Generally, the RLLT design supports maximum of N lookup tables with M memory tiles 110. The RLLT design includes two reconfigurable interconnect network fabrics: one in the front and one in the back of the memory pool. The front network 402 has N input ports 404. The back network 406 has N output ports 408. Depending on how the users partition the lookup tables from the memory tiles 110, these two interconnect fabrics 402 and 406 are configured to connect the input and output ports 404 and 408 of the RLLT 400 to the memory tiles 110 accordingly.

In some embodiments, each of these two networks 402 and 406 can be a crossbar. Since these networks are pre-configured before performing the lookups (which means these two networks do not change in run-time), they can be built from butterfly networks which are less expensive than crossbars. There are several common reconfigurable butterfly networks that can be used, including but not limited to Clos network, Benes network, and Omega network.

Figure 5:
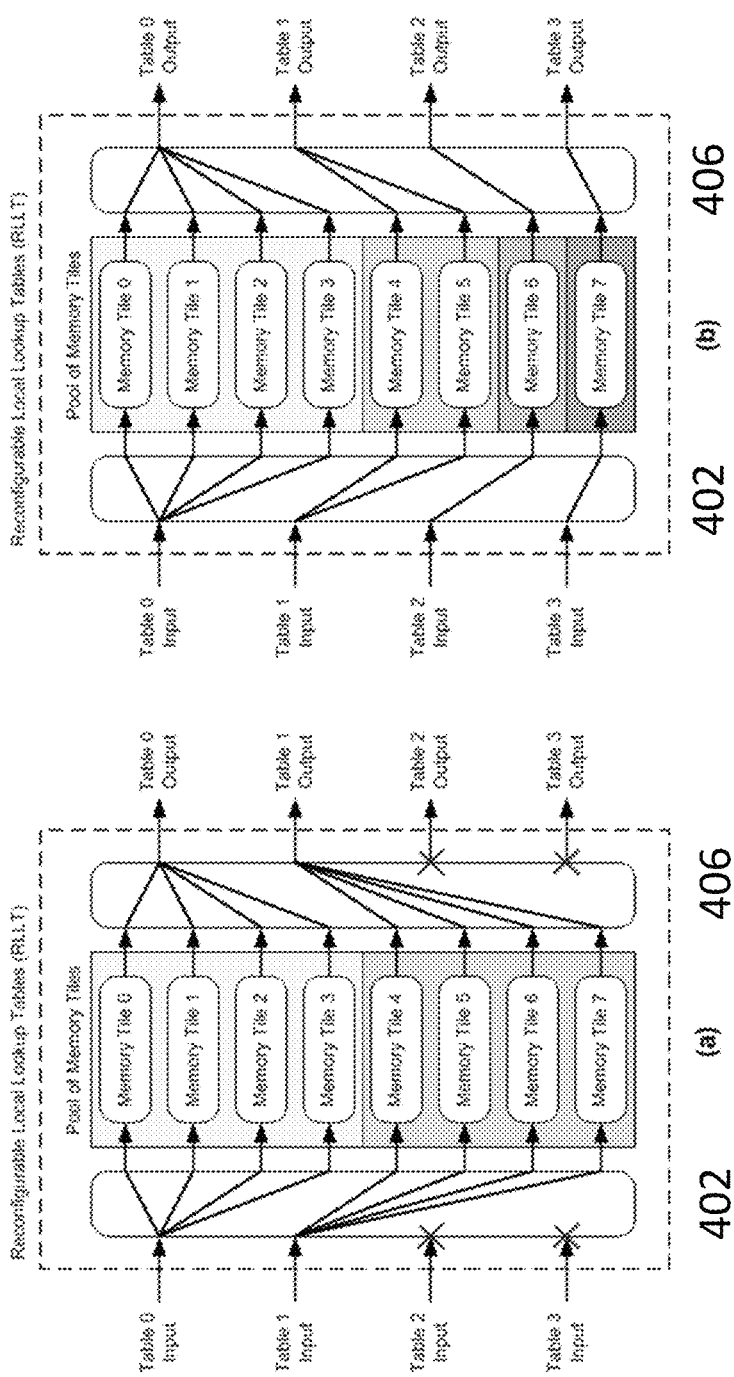
FIG. 5 is a draw illustrating examples for configuring the interconnection fabrics in RLLT for different lookup tables partition ways according to an embodiment of the present invention.

FIG. 5 shows two examples of how the two interconnect networks 402 and 406 in RLLT 400 are configured to support different number of lookup tables. FIG. 5(*a*) shows an example of the configuration for two lookup tables, which corresponds to the partition example in FIG. 3(*b*). In this example, only lookup input/output port 0 and port 1 are used. The user may then configure the front network 402 so that input port 0 is de-multiplexed to memory tiles 0, 1, 2 and 3, and input port 1 is de-multiplexed to memory tiles 4, 5, 6 and 7. Correspondingly, the back network 406 is configured so that memory tiles 0, 1, 2 and 3 are multiplexed into output port 0, and memory tiles 4, 5, 6 and 7 are multiplexed into output port 1. Since lookup input/output port 2 and port 3 are unused, they are disconnected by the two networks.

FIG. 5(*b*) is another example showing the configuration for four lookup tables, which corresponds to the partition example in FIG. 3(*d*). In this example, the user configures the front network 402 so that input port 0 is de-multiplexed to memory tiles 0, 1, 2 and 3, input port 1 is de-multiplexed to memory tiles 4 and 5, input port 2 is connected to memory tile 6, and input port 3 is connected to memory tile 7. Correspondingly, the back network 406 is configured so that memory tiles 0, 1, 2 and 3 are multiplexed into output port 0, memory tiles 4 and 5 are multiplexed into output port 1, memory tile 6 is connected to output port 2, and memory tile 7 is connected to output port 3.

After the user partitions the lookup tables and allocates memory tiles 110 for each lookup table, the user must assign the lookup tables to each local PE 102. A PE 102 can access one or multiple lookup tables in the run-time, and two or more PEs 102s can share the same lookup table. To enable this, each PE 102 in the system is associated with one or multiple PE Virtual Address. Looking at the whole picture, all PEs 102s in a device must have different PE virtual addresses and any two PEs should not have the same PE virtual address. The number of PE virtual addresses for a PE 102 is at least equal to the number of local lookup tables, which can be accessed by that PE 102.

Figure 6:
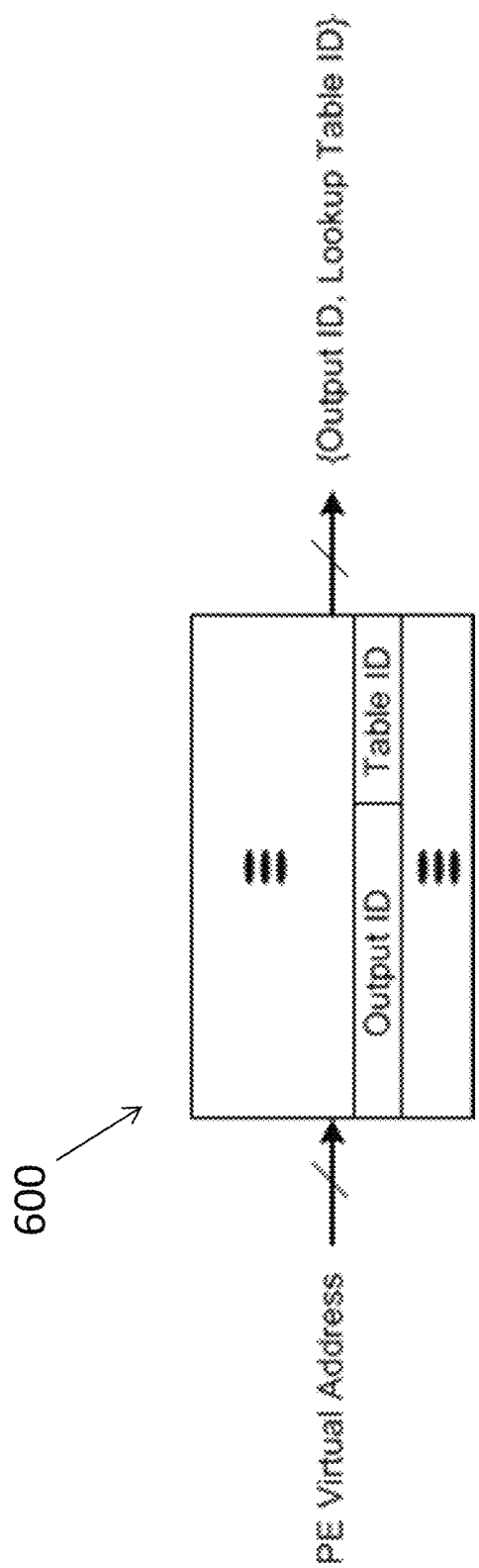
FIG. 6 is a diagram showing an example of the content of a programmable routing table on each input port of the interconnect element according to an embodiment of the present invention.

When an ISME 100 receives a packet, it determines which PE 102 it will send the packet to and which local lookup table will be used for performing lookup for that packet based on the destination PE virtual address embedded in the packet. To this end, the ISME 100 uses its Routing Tables 600 as depicted by the example in FIG. 6. Upon receiving a packet, the ISME 100 attracts the destination PE virtual address inside the packet and uses it as an index for a Routing Table 600. For each destination PE virtual address, the Routing Table 600 returns the output port ID for the ISME 100 to forward the packet to, and the table ID for performing a local lookup if the packet is sent to a local PE port.

Figure 7:
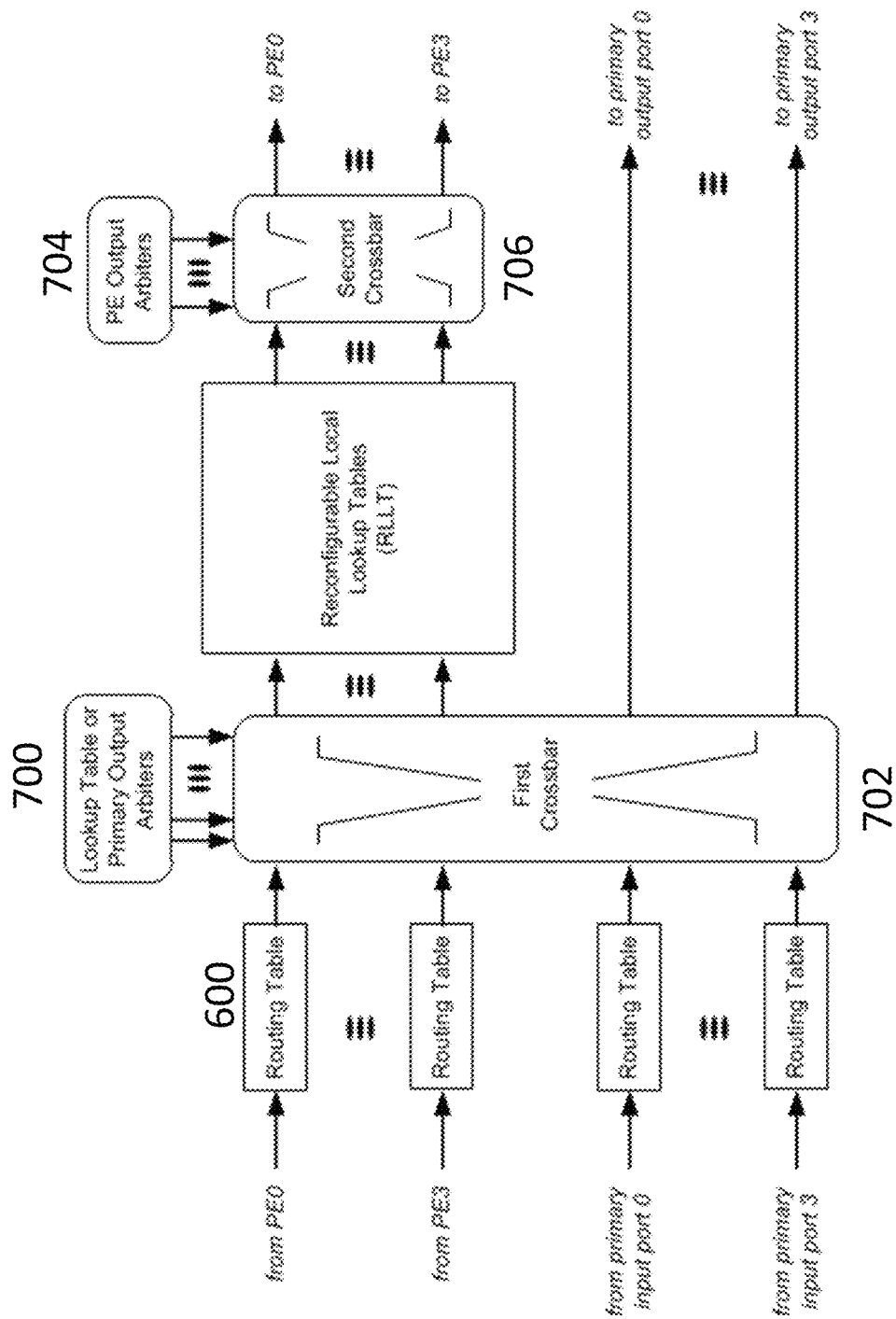
FIG. 7 is a block diagram showing an example of the design detail of the interconnect element according to an embodiment of the present invention.

The block diagram of an example of the entire ISME is shown in FIG. 7. For each input port, each input data including a packet and an associated lookup key used to perform lookup at a local lookup table. Each ISME input port (either a primary input or from a PE) is equipped with a Routing Table 600. If all Routing Tables 600s have the same content, only one Routing Table 600 would be needed and would be shared by all input ports. Here, each Routing Table 600 is used to determine the output port ID and local lookup table ID for each incoming packet.

In some embodiments, where the output port is a local PE, the lookup key associated with the packet is used to look up at the local lookup table given by the Routing Table 600. After the lookup operation is complete, both the packet and the lookup result are sent to that local PE.

In some embodiments, where the output port is a primary output port, no local lookup is performed; both the packet and the associated lookup key are directly forwarded to that primary output port to traverse to the downstream ISME.

In some embodiments, there may be multiple packets from multiple input ports, which are needed to be forwarded to the same a primary output port or the same a local lookup table. In this case, each output port and lookup table is equipped an arbiter 700 to resolve the conflict. Each arbiter 700 is configured to grant for each request from all input ports in a round-robin manner to guarantee fairness for incoming packets.

When an arbiter 700 of a primary output port or of a local lookup table grants to an input port, it also setups the First Crossbar 702, which enables the packet on that input port to be forwarded to the output port or the local lookup table from which the packet get granted from. For a packet going to a primary output port, it is directly forwarded to the downstream ISME corresponding to that output ports. For a packet going to a local lookup table, the lookup key associated with the packet is used to perform lookup on that table.

After local table lookup is done, the lookup result is sent along with the packet to a local PE. At this stage, again, there may be multiple lookup results and packets from multiple tables that need to send to the same a local PE (because different packets to a local PE can access different local lookup tables). To resolve this conflict, the output port going to each local PE is also equipped with a second arbiter 704, which grants the lookup results from different tables in a round-robin manner for achieving fairness. The granted outcome of these arbiters 704 will setup the Second Crossbar 706 so that lookup results are properly forwarded to their local PEs.

Figure 8:
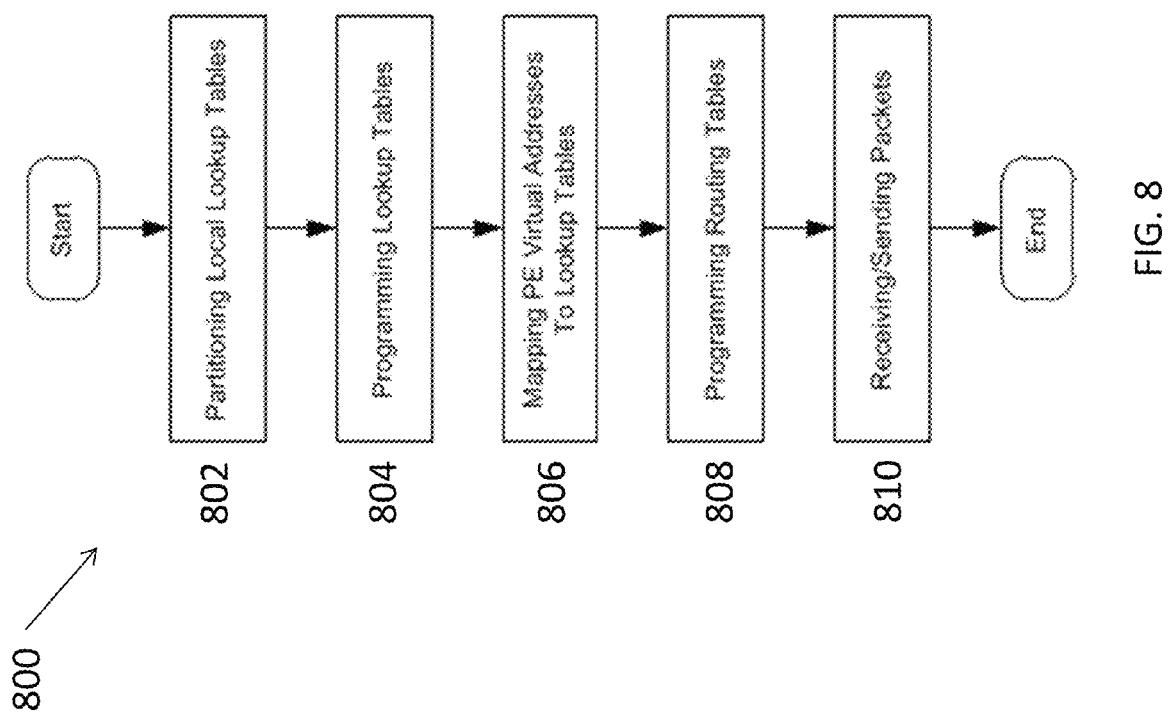
FIG. 8 is a flowchart of an example showing steps in programming the interconnect element according to an embodiment of the present invention.

FIG. 8 depicts a flowchart of an example showing steps in programming the interconnect element according to an embodiment of the present invention. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 8, the flowchart 800 starts at block 802, where the number of active lookup tables needed for the local PEs 102s attached to an ISME 100 is determined. The memory tiles 110 are then allocated/partitioned for each of the lookup tables including the number of memory tiles per table and the locations of these memory tiles 110. In some embodiments, the lookup tables partition should follow one or more of the following rules: 1) the number of memory tiles per table is a power of two; 2) memory tiles for each table are at consecutive locations; 3) there is no overlap between two any tables; 4) the number of tables is not more than the hardware-supported maximum number of tables. The lookup tables partitioning includes configuring the front and back interconnection fabrics in the RLLT 400 by the user accordingly.

Following lookup table partitioning, the flowchart 800 continues to block 804, where the contents of all active lookup tables are programmed. Depending on the structure and/or type of the memory tiles 110 and the lookup algorithms, the lookup tables can be programmed accordingly as hash-based, direct-access or TCAM lookup.

The flowchart 800 continues to block 806, where a set of PE virtual addresses is configured for each PE 102 in the system on chip. Each PE 102 can have multiple PE virtual addresses; and all PE virtual addresses in the entire system must be different so that the on-chip network can forward packets correctly from one PE 102 to another PE 102 based on the PE virtual address embedded in each packet. Each PE virtual address of a PE is then mapped to a local lookup table ID of the attached ISME 100.

After mapping each PE virtual address to a lookup table ID, the flowchart 800 continues to block 808, where the routing tables at input ports of each ISME 100 are programmed. The routing tables are configured to allow incoming packets to an ISME 100 to determine their output ports and the local lookup tables for performing lookups if the incoming packets go to local PEs 102s. The PE virtual address embedded in each input packet is used as an index for these routing tables.

Once all steps above are done, the flowchart 800 ends at block 810, where the ISME 100 is ready to accept and forward packets. All ISMEs 100s in a network-processing system on chip must be programmed before the system is able to process packets properly.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is therefore to understand that within the scope of the appended claims, the invention may be practiced otherwise than as specifically described herein. It is intended that the following claims and their equivalents define the scope of the invention.

We claim:

1. An interconnect element in a network-processing system on chip, comprising:
    a plurality of primary input ports and a plurality of primary output ports configured to connect with other interconnect elements;
    a plurality of PE ports configured to connect with a plurality of local processing engines (PEs);
    a routing kernel configured to route a plurality of incoming packets;
    a pool of shared memory tiles configured to form one or more lookup tables utilized by its local PEs, wherein the lookup tables include front and back interconnection fabrics of the pool of memory tiles configured to connect the memory tiles to input and output interfaces of the lookup tables, respectively.

2. The interconnect element of claim 1, wherein the primary input ports and primary output ports are configured to directly connect with other interconnect elements for building a bigger on-chip network to support a larger number of processing engines.

3. The interconnect element of claim 1, wherein each of the local PE ports is configured to connect to one local PE of the interconnect element.

4. The interconnect element of claim 1, wherein the PEs in an entire system communicate with each other indirectly through a network built from an array of interconnect elements.

5. The interconnect element of claim 1, wherein each of the local PEs has one or more PE virtual addresses, which are used by the interconnect element for transferring the incoming packets among the PEs.

6. The interconnect element of claim 5, wherein each of the PE virtual addresses is used to locate the PE that owns the PE virtual address and also to decide the local lookup table inside the interconnect element for performing the lookup operations before the incoming packets are sent to that PE.

7. The interconnect element of claim 1, wherein the pool of memory tiles are either static random-access memory (SRAM) or ternary content-addressable memory (TCAM) modules.

8. The interconnect element of claim 1, wherein the pool of memory tiles allocated for each lookup table is user-configurable and follows rules of: 1) the number of the memory tiles per table is a power of two; 2) the memory tiles for each lookup table are at consecutive locations; 3) there is no overlap between any two lookup tables; 4) the number of the lookup tables is no more than hardware-supported maximum number of lookup tables, which is equal to the number of the memory tiles.

9. The interconnect element of claim 1, wherein each of the lookup tables is configured to be dedicated to one local PE or to be shared by multiple local PEs; and one PE accesses one or multiple lookup tables at run-time.

10. The interconnect element of claim 1, wherein each of the interconnect fabrics is a crossbar or a configurable butterfly network.

11. The interconnect element of claim 1, wherein the router kernel includes:
    routing tables for determining one of the output ports and one of the lookup tables for the incoming packets;
    arbiters for resolving conflicts in cases there are multiple incoming packets from different input ports to be forwarded to the same output port or to access the same lookup table;
    a first and a second crossbar for transferring the incoming packets accordingly to outcomes of the arbiters.

12. The interconnect element of claim 11, wherein the routing tables are programmable, and are dedicated per input port or shared by all input ports if they have the same content.

13. The interconnect element of claim 12, wherein each of the routing tables uses a destination PE virtual address field in each input packet as an index for determining the output port and lookup table for the input packet.

14. The interconnect element of claim 11, wherein the arbiters act in a round-robin fashion to achieve fairness among all of the input packets.

15. The interconnect element of claim 11, wherein the first crossbar in configured to connect input ports to primary output ports and input interfaces of the lookup tables, and wherein the second crossbar is configured to connect output interfaces of lookup tables to output ports going to local processing engines.

16. A method for configuring an interconnect element in a network-processing system on chip, comprising:
    determining number of active lookup tables needed for a plurality of local processing engines (PEs) attached to the interconnect element;
    partitioning a pool of memory tiles for each of the lookup tables including number of memory tiles per table and locations of the memory tiles;
    programming contents of the active lookup tables based on structure and/or type of the memory tiles;
    mapping PE virtual addresses of the local PEs to the partitioned lookup tables;
    programming a plurality of routing tables at input ports of the interconnect element, wherein the routing tables are configured to allow the incoming packets to the interconnect element to determine their output ports and the local lookup tables for performing lookups if the incoming packets go to the local PEs.

17. The method of claim 16, wherein the PE virtual addresses are used by the interconnect element for transferring the incoming packets among the PEs.

18. The method of claim 16, wherein each of the PE virtual addresses is used to locate the PE that owns the PE virtual address and also to decide one of the local lookup tables inside the interconnect element for performing the lookup operations before the incoming packets are sent to that PE.

19. The method of claim 16, wherein the pool of memory tiles are either static random-access memory (SRAM) or ternary content-addressable memory (TCAM) modules.

20. The method of claim 16, further comprising:
    partitioning the pool of memory tiles for each of the lookup tables following all the rules of: 1) the number of the memory tiles per table is a power of two; 2) the memory tiles for each lookup table are at consecutive locations; 3) there is no overlap between any two lookup tables; 4) the number of the lookup tables is no more than hardware-supported maximum number of lookup tables, which is equal to the number of the memory tiles.

21. The method of claim 16, further comprising:
    sharing each of the lookup tables by multiple local PEs.

22. The method of claim 16, further comprising:
configuring one PE to access multiple lookup tables at run-time.

23. The method of claim 16, further comprising:
partitioning the lookup tables are partitioned by configuring front and back interconnection fabrics of the pool of memory tiles, wherein the front and back interconnection fabrics connect the memory tiles to input and output interfaces of the lookup tables.

24. The method of claim 23, wherein each of the interconnect fabrics is a crossbar or a configurable butterfly network.

* * * * *